(12) United States Patent
Conrad (10) Patent No.: US 8,324,517 B2
(45) Date of Patent: Dec. 4, 2012

(54) PEN TRANSCRIPTION SYSTEM UTILIZING A SPATIAL FILTER FOR LIMITING INTERFERENCE

(75) Inventor: David James Conrad, Newark, CA (US)

(73) Assignee: Luidia, Inc., San Carlos, CA (US)

( * ) Notice: Subject to any disclaimer, the term of this patent is extended or adjusted under 35 U.S.C. 154(b) by 537 days.

(21) Appl. No.: 12/642,771

(22) Filed: Dec. 19, 2009

(65) Prior Publication Data

US 2011/0147100 A1 Jun. 23, 2011

(51) Int. Cl.
*G06F 3/043* (2006.01)
*G01S 3/80* (2006.01)

(52) U.S. Cl. .................. 178/18.04; 345/177; 345/179; 345/173; 178/19.02; 367/128; 367/124; 367/127

(58) Field of Classification Search .............. None
See application file for complete search history.

(56) References Cited

U.S. PATENT DOCUMENTS

| 5,239,139 | A * | 8/1993 | Zuta | 178/19.02 |
| 6,654,008 | B2 * | 11/2003 | Ikeda et al. | 345/179 |
| 8,064,290 | B2 * | 11/2011 | Ding et al. | 367/128 |
| 8,120,994 | B2 * | 2/2012 | Ding et al. | 367/128 |
| 2002/0060665 | A1 * | 5/2002 | Sekiguchi et al. | 345/157 |
| 2004/0160429 | A1 * | 8/2004 | Blake et al. | 345/179 |
| 2005/0150697 | A1 * | 7/2005 | Altman et al. | 178/19.02 |
| 2008/0084789 | A1 * | 4/2008 | Altman | 367/127 |

* cited by examiner

*Primary Examiner* — Andrew L Sniezek
(74) *Attorney, Agent, or Firm* — Dov Rosenfeld; Inventek (57) ABSTRACT

A pen transcription system and method for locating a moveable signal source are disclosed. The transcription system includes a base having a planar base surface, first and second acoustical sensors that detect an acoustical signal emitted by a moveable signal source, the acoustical sensors being mounted on the base and separated from one another. The difference in time of detection between an EM signal and the acoustical signals is measured to determine the position of the moveable source. The acoustical sensors include a housing surrounding a detector. The housing has an aperture having a width that is less than the wavelength of said acoustical signal divided by 6.28 and a height that is substantially equal to an integer multiple of a wavelength of an interfering acoustical signal.

16 Claims, 7 Drawing Sheets

FIGURE 10

PEN TRANSCRIPTION SYSTEM UTILIZING A SPATIAL FILTER FOR LIMITING INTERFERENCE

BACKGROUND OF THE INVENTION

Acoustic-based distance measuring systems have been used to compute the position of a data entry object in a writing field for some time. For example, schemes that track and record the position of a pen on a white board are commercially available. As the user writes on the white board, the transcription system determines the location of the pen on the board and records the location for later use.

In such systems, a conventional marking pen of the type used with white boards is inserted into a housing that includes an acoustical transmitter and an infrared transmitter. As the user writes on the white board in the conventional manner, the transmitter sends a combination of acoustical and infrared pulses. Two receivers that are separated in space receive the signals generated by the housing. Each receiver measures the time difference between the time of arrival of the infrared pulse and the acoustical pulse to determine the distance of the housing from that receiver. These distance measurements are then combined to determine the position of the housing relative to the receivers.

Infrared is used for the light signals to avoid problems with background light in the area of use. The acoustical signals are typically in the ultrasound range so that the signals are beyond the human audible range. In addition, the higher frequencies provide better spatial resolution. Each acoustical receiver is typically constructed from a microphone such as a ceramic piezo microphone, PVDF films, a condenser microphone, an electrets condenser microphone (ECM), a moving coil microphone etc.

The pen transcription system must operate in the presence of various noise sources that are generated by other pen transcription systems in the room or by background ultrasound sources. For example, some motion detectors utilize an ultrasound signal to detect an object moving within the field of view of the motion detector. These narrow band sources can have a signal strength that is sufficient to mask the ultrasound signal from the pen in the transcription system. The transcription system pen is typically battery powered, and hence, cannot compete with a motion detector that is powered from an AC power source and generates a signal having an amplitude that is sufficient to detect the change in frequency of the signal after the signal has been reflected from a moving object. Similarly, there may be more than one operating pen transcription system in a room. For example, a classroom may have a number of "virtual" whiteboards on the classroom wall with different groups of students working at each whiteboard. The ultrasound receivers at each whiteboard must be able to distinguish from the signals originating at another white board.

SUMMARY OF THE INVENTION

The present invention includes a pen transcription system and method for locating a moveable signal source. The transcription system includes a base having a planar base surface, first and second acoustical sensors, and an EM detector. The first and second acoustical sensors detect an acoustical signal emitted by a moveable signal source, the first and second acoustical sensors being mounted on the base and separated from one another. The EM detector detects an EM signal that is synchronized with the acoustical signal. A controller measures the difference in time of detection between the EM signal and the acoustical signals detected by the first and second acoustical sensors. The first and second acoustical sensors each include a detector that generates an electrical signal in response to an acoustical signal in a predetermined frequency range, and a housing surrounding the detector. The housing has a housing aperture defined in relation to a base surface, the housing aperture having a width in a first plane that is perpendicular to the base surface, the width being less than ⅛ times the wavelength of the acoustical signal. The housing aperture has a height in a second plane that is perpendicular to the base surface and the first plane. The height is substantially equal to an integer multiple of a wavelength of an interfering acoustical signal.

In one aspect of the invention, one of the housings includes a mechanical filter that includes a passage in a solid material. The passage has a first end that is proximate to the detector, the first end having an opening whose largest dimension is less than ⅛ times the wavelength of the acoustical signal. The second end of the passage includes the housing aperture.

In another aspect of the invention, the passage has a rectangular cross-section having a width that is less than ⅛ times the wavelength of the acoustical signal and a height that decreases as a function of distance from the first end. In yet another aspect of the invention, the height decreases according to an oblate spheroid.

In a still further aspect of the invention, the housing aperture is positioned to enhance the detection of an acoustical signal traveling parallel to the base surface at a predetermined distance over the base surface and having a frequency equal to that of said acoustical signal emitted by said moveable source.

DETAILED DESCRIPTION OF THE PREFERRED EMBODIMENTS OF THE INVENTION

Figure 1:
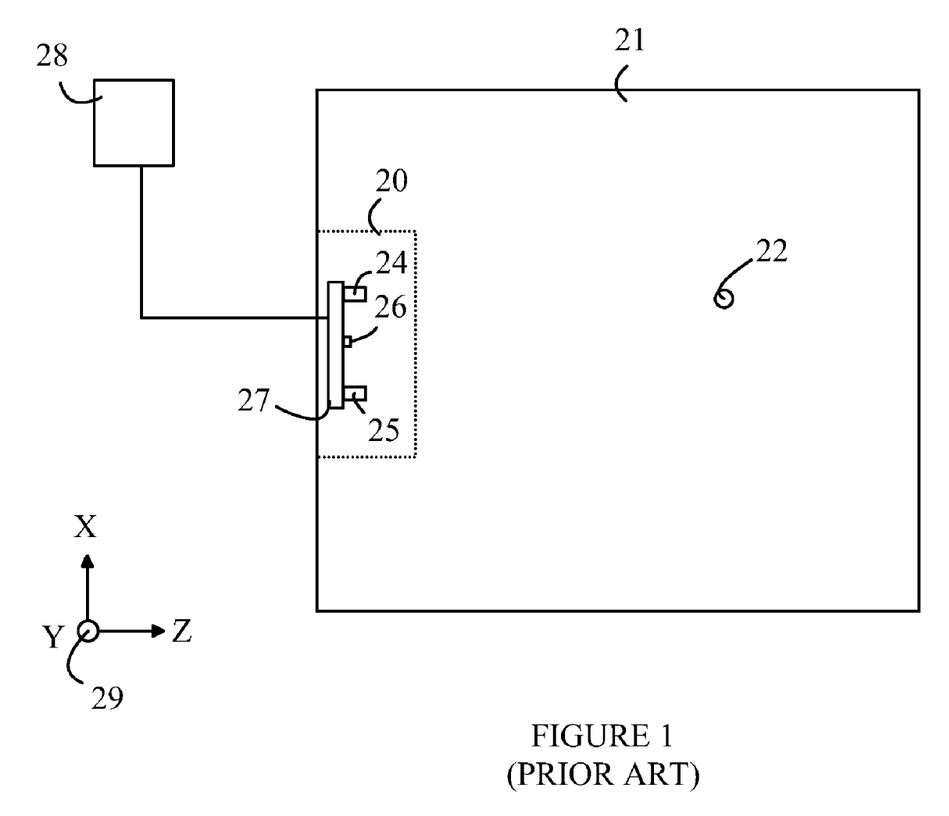
FIG. 1 illustrates a prior art pen transcription system.

The manner in which the present invention provides its advantages can be more easily understood with reference to FIG. 1, which illustrates a prior art pen transcription system. Pen transcription system 20 operates in conjunction with an input device 22 that has a housing that accepts a standard marking pen for writing on a work surface 21 such as a white board. Pen transcription system 20 is attached to one edge of work surface 21. Input device 22 emits both an electromagnetic (EM) signal and an acoustical signal in response to the user engaging a switch on the input device. The acoustical signal is typically in the ultrasound frequency range of 30 KHz to 80 KHz. Pen transcription system 20 includes an EM receiver 26 and two acoustical receivers, 24 and 25. A controller 27 computes the distance from input device 22 to each of the acoustical receivers by measuring the difference in arrival time between the acoustical signals received at the receivers and the EM signal. The computed position is forwarded to client device 28 such as a computer for use in recording the material that was written on the work surface.

To simplify the following discussion, a Cartesian coordinate system will be utilized in which the work surface is in the X-Z plane with the Y-axis pointing out of the plane of the drawing as shown at 29. Ideally, each of the acoustical receivers has a reception pattern that exhibits uniform gain for all points on or near the working surface in the X-Z plane with a decreasing gain as a function of Y so that sources that are significantly off the work surface are received with significantly reduced strength.

Figure 2A:
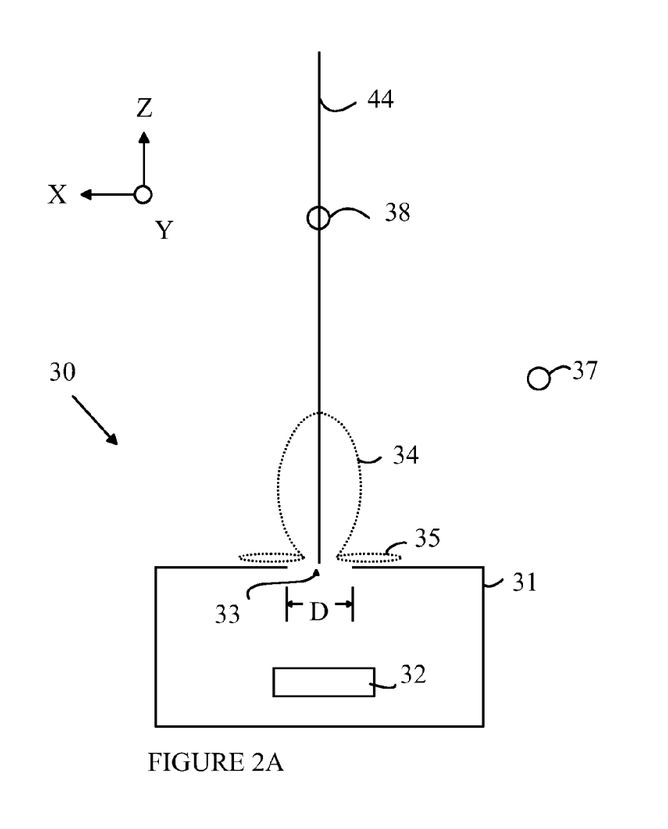
FIG. 2A is a cross-sectional view of an acoustic sensor 30 that can be utilized in a pen transcription system in a plane parallel to the X-Z plane.

Refer now to FIG. 2A, which is a cross-sectional view of an acoustic sensor 30 that can be utilized in a pen transcription system in a plane parallel to the X-Z plane. Acoustic sensor 30 includes a housing 31 in which a microphone 32 is located. Housing 31 has an opening 33 having a diameter D. The reception pattern for acoustic sensor 30 depends on the relationship of D to the wavelength, $\lambda$, of the acoustical signal being detected. The reception pattern for the case in which $D \gg \lambda/(2\pi)$ is shown at 34. It should be noted that the pattern has a main lobe that is shown at 34 and side lobes 35. For an ultrasound signal at 40 kHz in air, $\lambda/(2\pi)$ is approximately 1.4 mm.

The lobed pattern shown in FIG. 2A is problematic for detecting a pen with a transmitter just over the X-Z plane. The gain of the acoustical receiver when the pen is at 37 is significantly less than the gain of the acoustical receiver when the pen is at 38. Hence, the pen must be equipped with an acoustical transmitter that provides a signal that can be detected even when the pen is at location 37. This signal level is much greater than that required at location 38. As a result, excess power must be provided in the acoustical transmitter relative to the case in which the reception pattern is uniform for all locations in the X-Z plane.

Figure 2B:
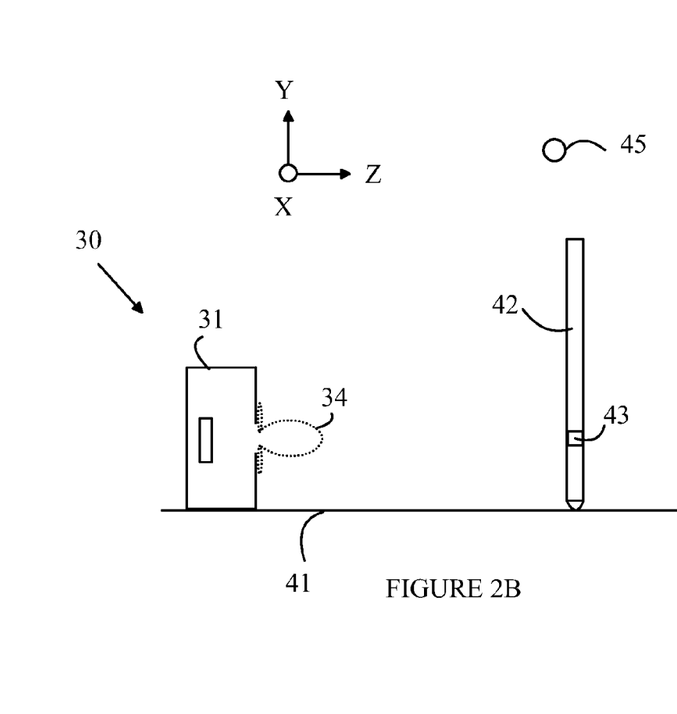
FIG. 2B is a cross-sectional view of acoustical sensor 30 through a plane parallel to the Y-Z plane that passes through location 38 shown in FIG. 2A.

Refer now to FIG. 2B, which is a cross-sectional view of acoustical sensor 30 through a plane parallel to the Y-Z plane that passes through location 38 shown in FIG. 2A. Sensor 30 is shown in relation to a pen 42 that is writing on a working surface 41. Pen 42 has an acoustical transmitter 43 that is mounted at a height over surface 41 that is substantially the same at the height of the opening in acoustical sensor 30 over surface 41. Since this height does not change substantially as the pen is moved to different locations along line 44, transmitter 43 remains aligned with lobe 34 as the pen is moved to different locations and the gain of the sensor for various locations on line 44 does not substantially change from point to point.

It should be noted that an acoustical signal that originates at a location that is substantially above surface 41, such as location 45 shown in FIG. 2B is received with significantly less gain due to the lobes in the reception pattern of sensor 30. Hence, the large aperture sensor shown in FIGS. 2A and 2B performs well in terms of rejecting extraneous sources that originate from locations that are substantially above the working surface.

Figure 3A:
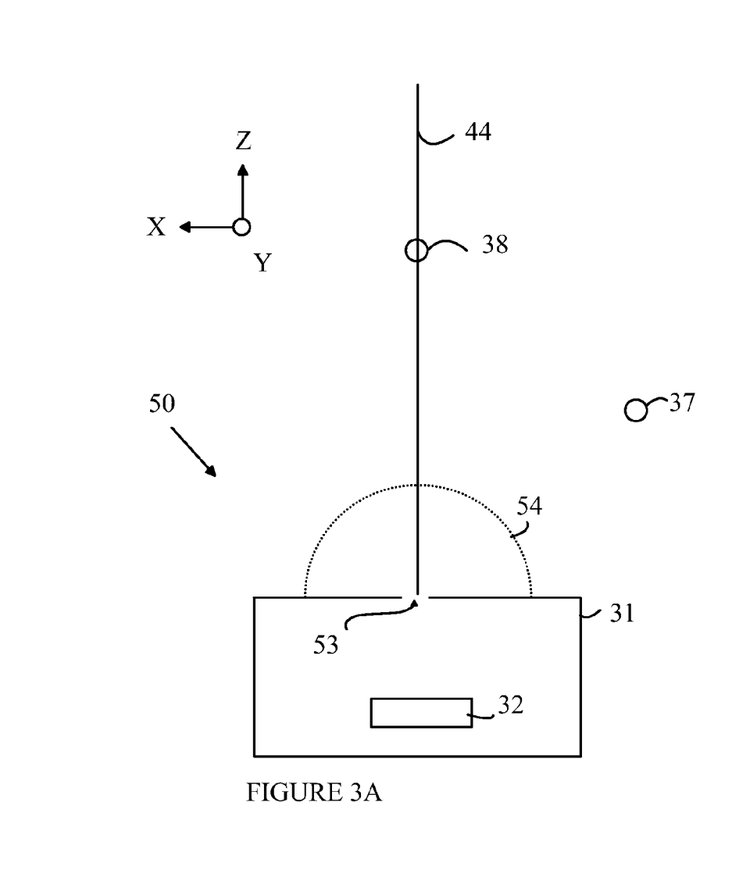
FIGS. 3A and 3B illustrate the reception pattern obtained with a small aperture sensor 50 that corresponds to the cross-sectional views shown in FIGS. 2A and 2B.
Figure 3B:
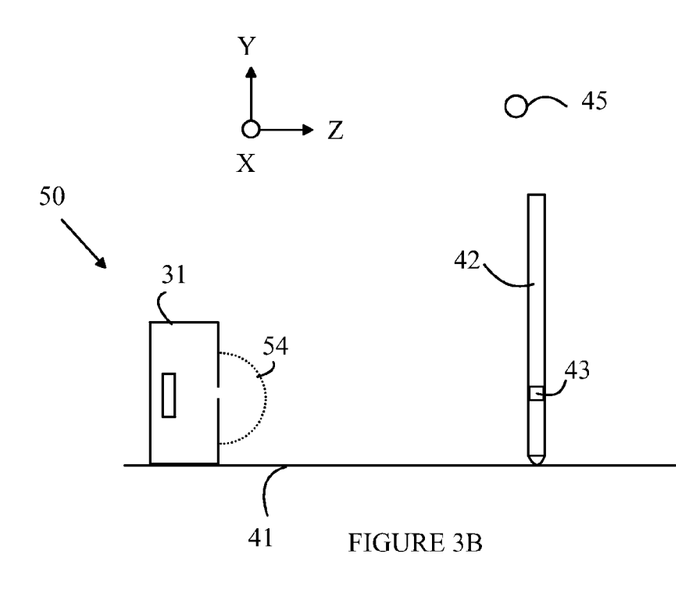

In contrast, a small aperture acoustical sensor in which $D \ll \lambda/(2\pi)$ performs well in terms of providing substantially uniform gain for various pen locations in the X-Z plane, but performs poorly in terms of rejecting background sources that are substantially above the working surface. Refer now to FIGS. 3A and 3B, which illustrate the reception pattern obtained with a small aperture sensor 50 having an aperture 53. FIGS. 3A and 3B are cross-sectional views that correspond to the cross-sectional views shown in FIGS. 2A and 2B. Acoustical sensor 50 differs from sensor 30 discussed above with reference to FIGS. 2A and 2B in that the aperture is much less than $\ll \lambda/(2\lambda)$. As a result, the reception pattern of acoustical sensor 30 is omni directional as shown at 54, and signals originating at various points in the X-Z plane are received with an amplitude that depends only on the distance of the source from acoustical sensor 30. Hence, acoustical sensor 50 overcomes the problems associated with the variable gain discussed above with respect to acoustical sensor 30. Unfortunately, acoustical sensor 50 also has an omni directional reception pattern in the Y-Z plane, and hence, background sources that are substantially above work surface 41 are received with substantially the same gain as a valid source that is operating on work surface 41 at the same distance from acoustical sensor 50.

Figure 4:
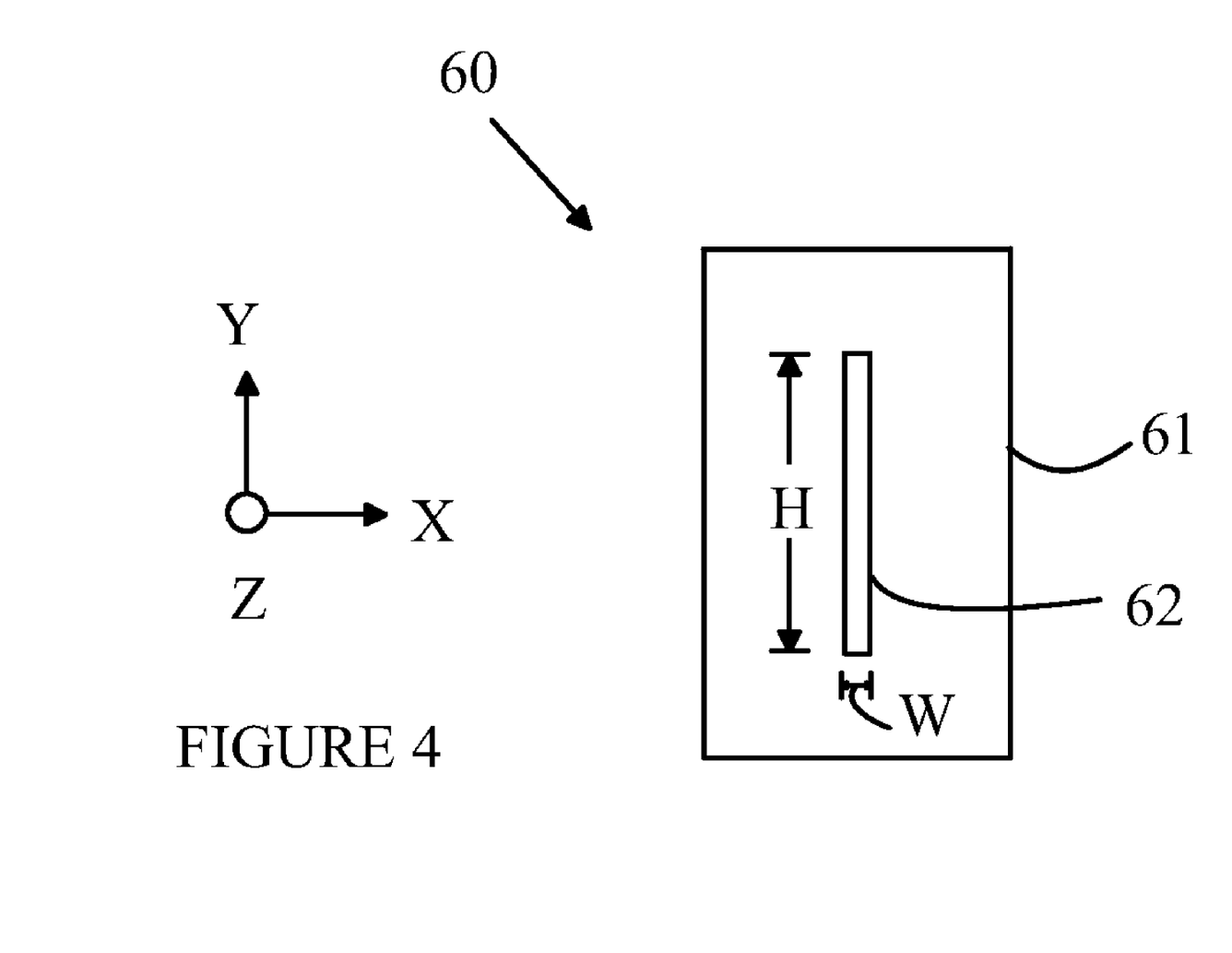
FIG. 4 illustrates an acoustical sensor according to one aspect of the present invention.
Figure 5A:
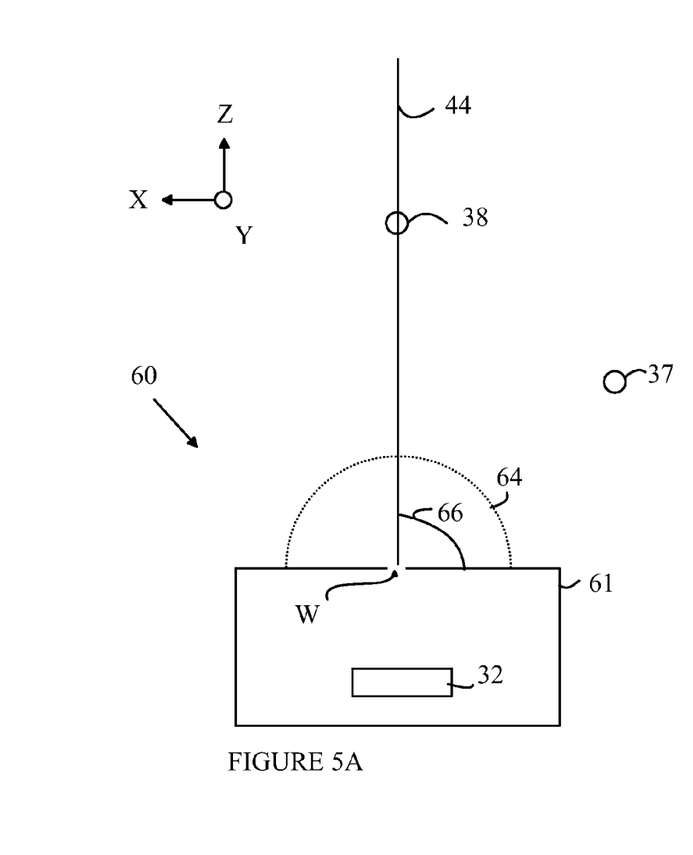
FIG. 5A illustrates the gain pattern of acoustical sensor 60 in the X-Z plane.
Figure 5B:
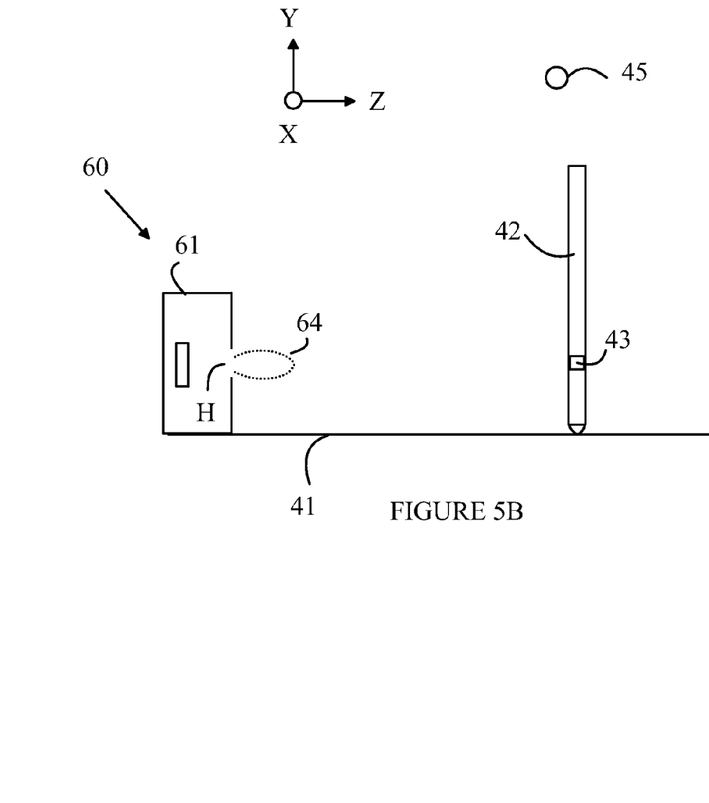
FIG. 5B illustrates the large height of the sensor results in a gain pattern in the Y-Z plane that has a lobed profile.

Refer now to FIG. 4, which is a top view of an acoustical sensor according to one aspect of the present invention. Acoustical sensor 60 differs from acoustical sensor 50 discussed above in that aperture 62 in the surface of enclosure 61 is rectangular. The height, H, of aperture 62 is chosen such that $H > \lambda/(2\pi)$ while the width, W is chosen such that $W \ll \lambda/(2\pi)$. Refer now to FIGS. 5A and 5B, which are cross-sectional views of acoustical sensor 60 analogous to those discussed above with respect to FIGS. 2A and 2B. Referring to FIG. 5A, the gain pattern 64 of acoustical sensor 60 in the X-Z plane is substantially uniform as a function of angle 66. Hence, the variation in gain in the X-Z plane that detracted from acoustical sensor 30 discussed above is substantially eliminated. Referring to FIG. 5B, the large height of the sensor results in a gain pattern in the Y-Z plane that has a lobed profile 64 similar to that discussed above with respect to acoustical sensor 30, and hence, signals from sources that are substantially above work surface 41, such as source 45, are substantially attenuated.

While the arrangement shown in FIGS. 5A and 5B provides discrimination against acoustical signals that originate significantly off the work surface, the discrimination is relatively frequency insensitive. Ideally, the receiver should have the maximum sensitivity for acoustical signals traveling in a plane parallel to the work surface for source locations that are within the range of heights associated with the pen transmitter and anywhere on the work surface. To simplify the discussion, it will be assumed that the origin of the Cartesian coordinate system shown in FIGS. 5A and 5B is located at the center of the aperture in acoustical sensor 60. The reception should be maximized for all positive Z values of the pen and for Y locations that typically vary over a ±15-degree range about the X-plane for signals of the frequency transmitted by pen 45. The reception efficiency should also be substantially reduced for signal sources outside of this angular range. In addition, it would be advantageous to reduce the reception sensitivity for signals at known frequencies that are utilized by motion detectors and the like.

Figure 6:
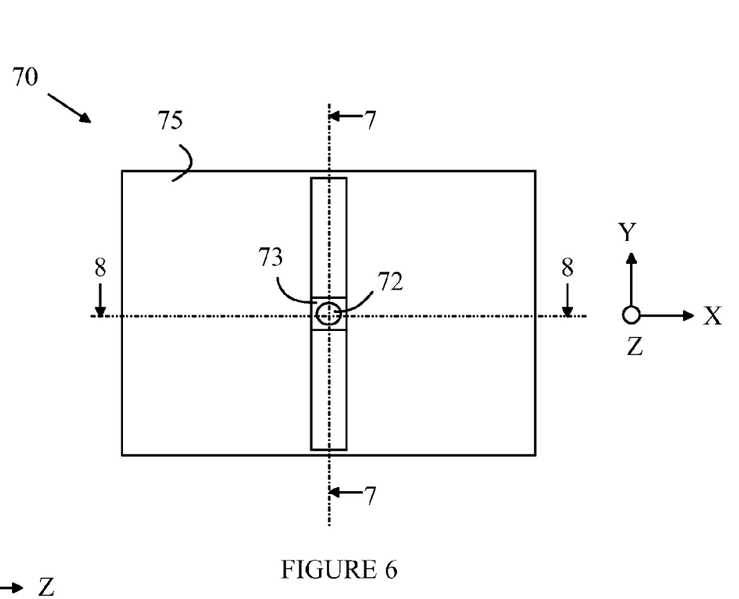
FIG. 6 is a front view of acoustical receiver 70.
Figure 7:
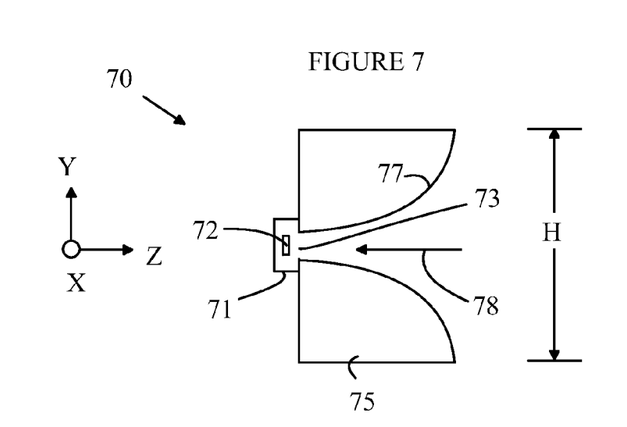
FIG. 7 is a cross-sectional view of acoustical receiver 70 through line 7-7 shown in FIG. 6.
Figure 8:
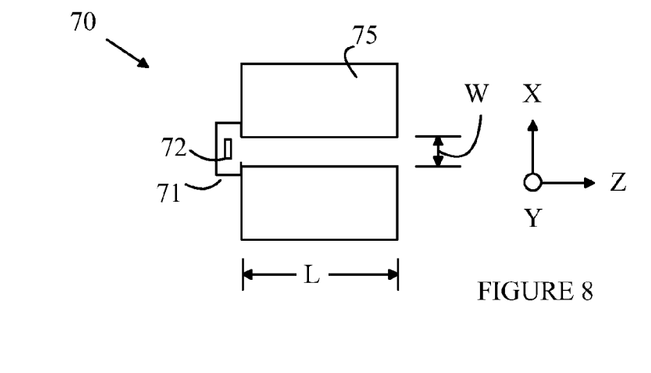
FIG. 8 is a cross-sectional view of acoustical receiver 70 through line 8-8 shown in FIG. 6.

Refer now to FIGS. 6-8, which illustrate an acoustical receiver according to another embodiment of the present invention. FIG. 6 is a front view of acoustical receiver 70, FIG. 7 is a cross-sectional view of acoustical receiver 70 through line 7-7 shown in FIG. 6, and FIG. 8 is a cross-sectional view of acoustical receiver 70 through line 8-8 shown in FIG. 6. Acoustical receiver 70 includes a microphone 72 that is enclosed in a housing 71 that has an aperture 73. A mechanical filter 75 is connected to housing 71. Aperture 73 is chosen to provide a gain that is substantially uniform in the X-Z plane for the frequency of the acoustical signal transmitted by the pen.

Mechanical filter 75 serves two functions. First, mechanical filter 75 alters the reception function of aperture 73 from an omni-directional reception pattern in X and Y to a pattern that is omni-directional in the X-Z plane and unidirectional in the Y-Z plane. This reception pattern discriminates against sources that are significantly above the X-Z plane by more than that expected for the pen at the various locations on the work surface. Second, mechanical filter 75 matches the acoustical impedance of the air to that of the orifice 73 of microphone housing 71, which provides an acoustic gain of about 10 db.

The dimensions of the mechanical filter are determined by the wavelength of the acoustical signal transmitted by the pen in the transcription system and the wavelength of the background acoustical signals that are to be attenuated. The most common background acoustical source is associated with motion detectors and has a frequency of typically 40 KHz. The pen typically transmits over a somewhat broad band of frequencies centered at 43 KHz, but extending down to 40 KHz. Hence, the mechanical filter should not discriminate against sources in the 40 KHz to 46 KHz range that generate signals that are traveling parallel to the work surface at a height consistent with that expected from the pen.

In practice, the narrow dimension of the mechanical filter is chosen to be much less than the wavelength of the acoustical signal from the pen to provide the omni-directional reception pattern in the X-Z plane. Since this dimension is also much less than the wavelength of the interfering source, an interfering source that transmits a signal parallel to the work surface at the correct height can also enter the acoustical receiver. However, such interfering signals are not common, since most of the motion sensor signals arise from transmitters that are far from the work surface, and hence, are not traveling parallel to the work surface at the correct distance from the work surface.

The vertical opening, H, which is parallel to the Y-axis is chosen to be one wavelength of the acoustical signal in the air of the undesired background signal, i.e., 40 KHz in the current example. This provides for the cancellation of any acoustical waves of this wavelength that are orthogonal to the Z-X plane. Since the desired signal is traveling parallel to the work surface, the desired signal is not attenuated, and is, in fact, provided with the gain discussed above.

The shape of the curved surface is an oblate spheroid in one aspect of the present invention. That is, the radius of curvature of surface 77, r, is given by $$r(d) = \sqrt{r_t^2 + d^2 \tan^2(\Theta)}$$

where $r_t$ is the radius of surface 77 at the aperture to housing 71 and $f$ is the half angle of surface 77 at the aperture to the housing.

In the example discussed above, the interfering source is at 40 KHz, which corresponds to a wavelength in the air of 8.6 mm Hence, H is chosen to be 8 mm. The width of the aperture is taken to be 1.25 mm, which satisfies the constraint of being much less than the wavelength to provide omni-directional reception in the X-Z plane. The half angle $\theta$ is 10 degrees and L is 5 mm. This arrangement provides −20 dB attenuation for a 40 KHz traveling at right angles to the X-Z plane relative to a signal approaching the mechanical filter on axis 78 shown in FIG. 7.

In general, the parameters $\theta$ and $r_t$ are chosen to provide satisfactory reception for the source in the X-Z plane while providing improved rejection for sources out of the X-Z plane. The reception for a source in the X-Z plane or near to that plane is preferably omni-directional, so that each receiver provides a signal that does not depend on the angle at which the signal arrives at the receiver. That is, the receiver should have a reception pattern like that shown at 54 in FIG. 3A. This pattern can be obtained by utilizing a very small aperture (i.e., an aperture $<<\lambda/6.28$) in the microphone housing; however, this leads to a significant attenuation in the acoustical signals. By utilizing a somewhat larger aperture and correctly choosing the shape of the filter, a substantially omni-directional reception pattern can be maintained for sources in the X-Z plane while providing less attenuation. In general, there is a range of reception patterns around the ideal case that is acceptable. An optimization program can be used to search for $\theta$ and $r_t$ values that provide reception patterns that are within this range. These $\theta$ and $r_t$ values are then examined to find the values that provide the attenuate signals that arise from sources that are substantially above the X-Z plane.

Figure 9:
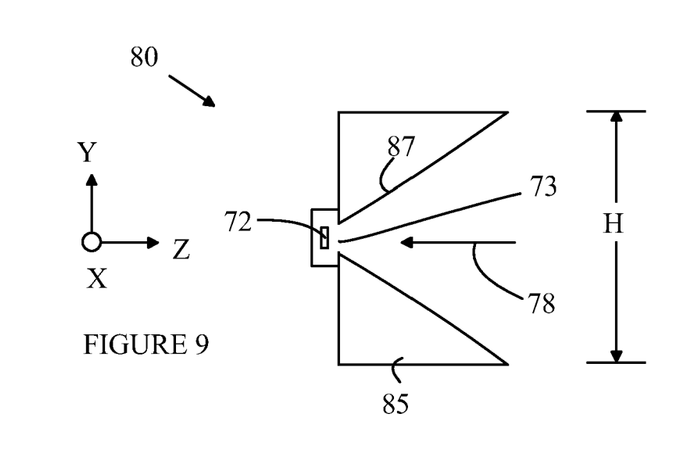
FIG. 9 is a cross-sectional view of an acoustical receiver according to another embodiment of the present invention that utilizes a planar horn shape.

While the above-described horn shape provides an improvement over the prior art, other horn shapes could also be utilized. Refer now to FIG. 9, which is a cross-sectional view of a receiver according to another embodiment of the present invention. To simplify the following discussion, those elements of receiver 80 that serve functions analogous to elements shown in FIGS. 6-8 have been given the same numerical designations and will not be discussed further here. Receiver 80 utilizes a different horn shape in mechanical filter 85 than that used in receiver 70. In particular, the horn utilizes a planar boundary 87 in place of the oblate spheroid used in receiver 70. While the planar shape does not provide the same degree of rejection of the out-of-plane signals, the greater mechanical simplicity, and hence, lower cost, could make such embodiments attractive in certain cost sensitive applications.

Figure 10:
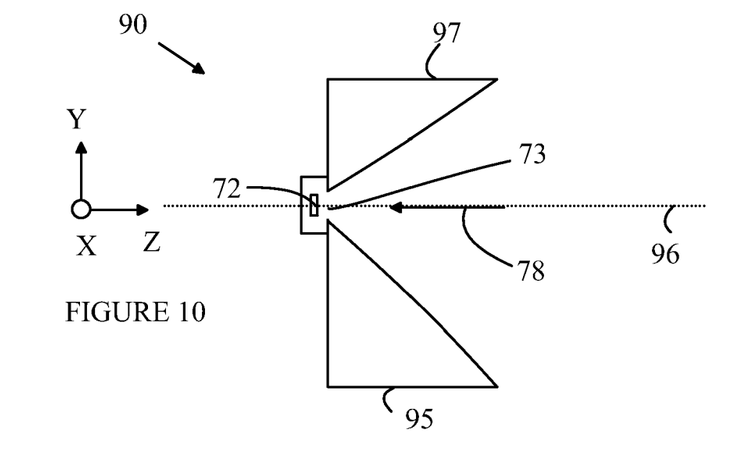
FIG. 10 is a cross-sectional view of an acoustical receiver according to another embodiment of the present invention that utilizes an asymmetrical horn shape.

In the above-described embodiments, the mechanical filter is symmetrical about the X-Z plane. However, embodiments in which the filter is asymmetrical could also be utilized. Refer now to FIG. 10, which is a cross-sectional view of a receiver according to another embodiment of the present invention. To simplify the following discussion, those elements of receiver 90 that serve functions analogous to elements shown in FIGS. 6-8 have been given the same numerical designations and will not be discussed further here. Receiver 90 utilizes yet a different horn shape in mechanical filter 95 than that used in receiver 70. In particular, horn 95 has a shape in which the portion of horn 95 that is below the X-Z plane shown at 96 is not a mirror image of the portion above the X-Z plane. Such embodiments can be useful in designs in which the distance from writing surface to the microphone sets a minimum for the distance from the writing surface to the aperture to the microphone.

In the above examples, the height of the aperture in the acoustical sensor housing is chosen to be equal to the wavelength of the interfering acoustical signal. However, the height of the aperture could also be substantially equal to any integer multiple of this wavelength. It should be noted that if the height is not precisely an integer multiple of the wavelength of the undesired signal, the cancellation of the rejection of an undesired signal traveling in a direction perpendicular to the work surface will not be complete. However, the resulting cancellation can still be a significant improvement over that provided by prior art systems.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus comprising a receiver comprising:
    a base having a planar base surface;
    first and second acoustical sensors that detect an acoustical signal emitted by a moveable signal source, said first and second acoustical sensors being mounted on said base and separated from one another;
    a EM detector that detects an EM signal that is synchronized with said acoustical signal; and
    a controller that measures the difference in time of detection between said first EM signal and said acoustical signals detected by said first and second acoustical sensors;
    wherein said first and second acoustical sensors each comprise:
    a detector that generates an electrical signal in response to an acoustical signal in a predetermined frequency range; and
    a housing surrounding said detector, said housing having a housing aperture defined in relation to a base surface, said housing aperture having a width in a first plane that is perpendicular to said base surface, said width being less than the wavelength of said acoustical signal divided by 6.28 and said housing aperture having a height in a second plane that is perpendicular to said base surface and said first plane, said height being substantially equal to an integer multiple of a wavelength of an interfering acoustical signal.

2. The apparatus of claim 1 wherein said integer multiple is one.

3. The apparatus of claim 1 wherein one of said housings comprises a mechanical filter comprising a passage in a solid boundary, said passage having a first end that is proximate to said detector and having an opening whose largest dimension is less than said wavelength of said acoustical signal divided by 6.28 and a second end that comprises said housing aperture.

4. The apparatus of claim 3 wherein said passage has a rectangular cross-section having a width that is less than said wavelength of said acoustical signal divided by 6.28 and a height that decreases as a function of distance from said second end.

5. The apparatus of claim 4 wherein said height decreases according to an oblate spheroid.

6. The apparatus of claim 3 wherein said housing aperture is positioned to enhance the detection of an acoustical signal traveling parallel to said base surface at a predetermined distance over said base surface.

7. An acoustical receiver comprising:
    a detector that generates an electrical signal in response to an acoustical signal in a predetermined frequency range; and
    a housing surrounding said detector, said housing having a housing aperture defined in relation to a base surface, said housing aperture having a width in a first plane that is perpendicular to said base surface, said width being less than the wavelength of said acoustical signal divided by 6.28, and said housing aperture having a height in a second plane that is perpendicular to said base surface and said first plane, said height being substantially equal to an integer multiple of a wavelength of an interfering acoustical signal.

8. The receiver of claim 7 wherein one of said housings comprises a mechanical filter comprising a passage in a solid material, said passage having a first end that is proximate to said detector and having an opening whose largest dimension is less than said wavelength of said acoustical signal divided by 6.28 and a second end that comprises said housing aperture.

9. The receiver of claim 8 wherein said passage has a rectangular cross-section having a width that is less than the wavelength of said acoustical signal divided by 6.28 and a height that decreases as a function of distance from said second end.

10. The receiver of claim 9 wherein said height decreases according to an oblate spheroid.

11. The receiver of claim 8 wherein said housing aperture is positioned to enhance the detection of an acoustical signal traveling parallel to said base surface at a predetermined distance over said base surface.

12. A method for determining the position of a moveable signal source on a work surface, said method comprising:
    providing a receiver at a fixed location on said work surface, said receiver comprising:
    first and second acoustical sensors that detect an acoustical signal emitted by said moveable signal source, said first and second acoustical sensors being mounted on said work surface and separated from one another; and
    a EM detector that detects an EM signal that is synchronized with said acoustical signal; and
    measuring the difference in time of detection between said first EM signal and said acoustical signals detected by said first and second acoustical sensors;
    wherein said first and second acoustical sensors each comprise:
    a detector that generates an electrical signal in response to an acoustical signal in a predetermined frequency range; and
    a housing surrounding said detector, said housing having a housing aperture defined in relation to a base surface, said housing aperture having a width in a first plane that is perpendicular to said base surface, said width being less than the wavelength of said acoustical signal divided by 6.28 and said housing aperture having a height in a second plane that is perpendicular to said base surface and said first plane, said height being substantially equal to an integer multiple of a wavelength of an interfering acoustical signal.

13. The method of claim 12 wherein one of said housings comprises a mechanical filter comprising a passage in a solid material, said passage having a first end that is proximate to said detector and having an opening whose largest dimension is less than said wavelength of said acoustical signal divided by 6.28 and a second end that comprises said housing aperture.

14. The method of claim 13 wherein said passage has a rectangular cross-section having a width that is less than the wavelength of said acoustical signal divided by 6.28 and a height that decreases as a function of distance from said first end.

15. The method of claim 14 wherein said height decreases according to an oblate spheroid.

16. The method of claim 13 wherein said housing aperture is positioned to enhance the detection of an acoustical signal traveling parallel to said base surface at a distance over said base surface determined by said moveable source.

* * * * *